(12) United States Patent
Hogue

(10) Patent No.: US 12,054,018 B2
(45) Date of Patent: Aug. 6, 2024

(54) LUMINESCENT NON-PNEUMATIC TIRE DEVICE

(71) Applicant: Johnnie Hogue, Fort Worth, TX (US)

(72) Inventor: Johnnie Hogue, Fort Worth, TX (US)

( * ) Notice: Subject to any disclaimer, the term of this patent is extended or adjusted under 35 U.S.C. 154(b) by 114 days.

(21) Appl. No.: 17/894,432

(22) Filed: Aug. 24, 2022

(65) Prior Publication Data
US 2024/0066927 A1 Feb. 29, 2024

(51) Int. Cl.
*B60C 7/10* (2006.01)
*B60C 7/14* (2006.01)
*B60C 11/00* (2006.01)
*B60C 19/00* (2006.01)

(52) U.S. Cl.
CPC ............... *B60C 7/107* (2021.08); *B60C 7/10* (2013.01); *B60C 7/14* (2013.01); *B60C 11/0008* (2013.01); *B60C 19/00* (2013.01); *B60C 2200/10* (2013.01)

(58) Field of Classification Search
CPC ......... B60C 2200/10; B60C 7/00; B60C 7/08; B60C 7/10; B60C 7/107; B60C 7/14; B60C 7/146; B60C 7/16; B60C 7/18; B60C 11/00; B60C 11/0008; B60C 1/0016; B60C 1/0025; B60C 13/00; B60C 13/003; B60C 17/06; B60C 17/061; B60C 2017/068; B60C 19/00
USPC ................................. 152/151, 152, 156, 158
See application file for complete search history.

(56) References Cited

U.S. PATENT DOCUMENTS

| | | | |
|---|---|---|---|
| 5,343,916 A | 9/1994 | Duddy | |
| 9,120,351 B2 | 9/2015 | Mun | |
| D750,548 S | 3/2016 | Matsumoto | |
| 9,352,617 B2 | 5/2016 | Zhang | |
| 9,751,270 B2 | 9/2017 | Thompson | |
| 10,538,130 B2 | 1/2020 | Kim | |
| 2012/0318421 A1* | 12/2012 | Matsuda | B60C 7/121 152/323 |
| 2017/0008341 A1* | 1/2017 | Martin | B60C 7/107 |
| 2017/0087931 A1 | 3/2017 | Gaylo | |
| 2017/0282648 A1* | 10/2017 | Taylor | B60C 3/04 |
| 2021/0039443 A1 | 2/2021 | Hwang | |
| 2021/0178832 A1* | 6/2021 | Eom | B60C 13/001 |

FOREIGN PATENT DOCUMENTS

| | | |
|---|---|---|
| CN | 201693993 U * | 1/2011 |
| CN | 105730149 B * | 9/2017 |
| CN | 108656869 A * | 10/2018 |

(Continued)

OTHER PUBLICATIONS

Qi K, CN-105730149-B, machine translation. (Year: 2017).*

(Continued)

*Primary Examiner* — Sedef E Paquette

(57) ABSTRACT

A luminescent non-pneumatic tire device for supporting a wheel rim on a rough road surface without needing to be filled with air includes a cylindrical inner wall, a tread concentrically positioned around the inner wall, and a pair of sidewalls coupling the inner wall to the tread. A cable is concentrically coupled around the inner wall, and a plurality of flat springs extend from the cable to the tread. Each flat spring is deformable and contributes to smoothing bumps in a road surface traversed by the device. The device also comprises a photoluminescent material which serves to increase the visibility of the device.

7 Claims, 4 Drawing Sheets

(56) References Cited

FOREIGN PATENT DOCUMENTS

| | | | | | |
|---|---|---|---|---|---|
| GB | 189919076 | A | * | 12/1899 | |
| KR | 20090008841 | A | * | 1/2009 | ............... B60C 7/10 |
| WO | WO2014113904 | | | 7/2014 | |

OTHER PUBLICATIONS

Wei Q, CN-201693993-U, machine translation. (Year: 2011).*
Zheng B, CN-108656869-A, machine translation. (Year: 2018).*
Lee Tae Hwan, KR-20090008841-A, machine translation. (Year: 2009).*

* cited by examiner

LUMINESCENT NON-PNEUMATIC TIRE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to non-pneumatic tires and more particularly pertains to a new non-pneumatic tire for supporting a wheel rim on a rough road surface without needing to be filled with air.

(2) Description of Related Art Including Information Disclosed Under 37 CFR 1.97 and 1.98

The prior art relates to non-pneumatic tires which rely on elastic materials to reduce the impacts of bumps in the road on a vehicle traveling across the road. The prior art discloses myriad structures for achieving this functionality, but it does not disclose a non-pneumatic tire with separate flat springs disposed in an annular space between the rim of the wheel and the tread of the tire and connected to a concentrically mounted cable. Nor does the prior art disclose a device with this structure that also comprises photoluminescent material for increasing visibility of the device, thereby decreasing the likelihood of collisions, which is especially advantageous for small vehicles like motorcycles which can be more difficult to spot on the road.

BRIEF SUMMARY OF THE INVENTION

An embodiment of the disclosure meets the needs presented above by generally comprising a cylindrical inner wall, a tread concentrically positioned around the inner wall, and a pair of sidewalls coupling said inner wall to said tread. A cable is concentrically coupled around the inner wall, and a plurality of flat springs extend from the cable to the tread. Each flat spring is deformable and contributes to smoothing bumps in a road surface traversed by the device. The device also comprises a photoluminescent material which serves to increase the visibility of the device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
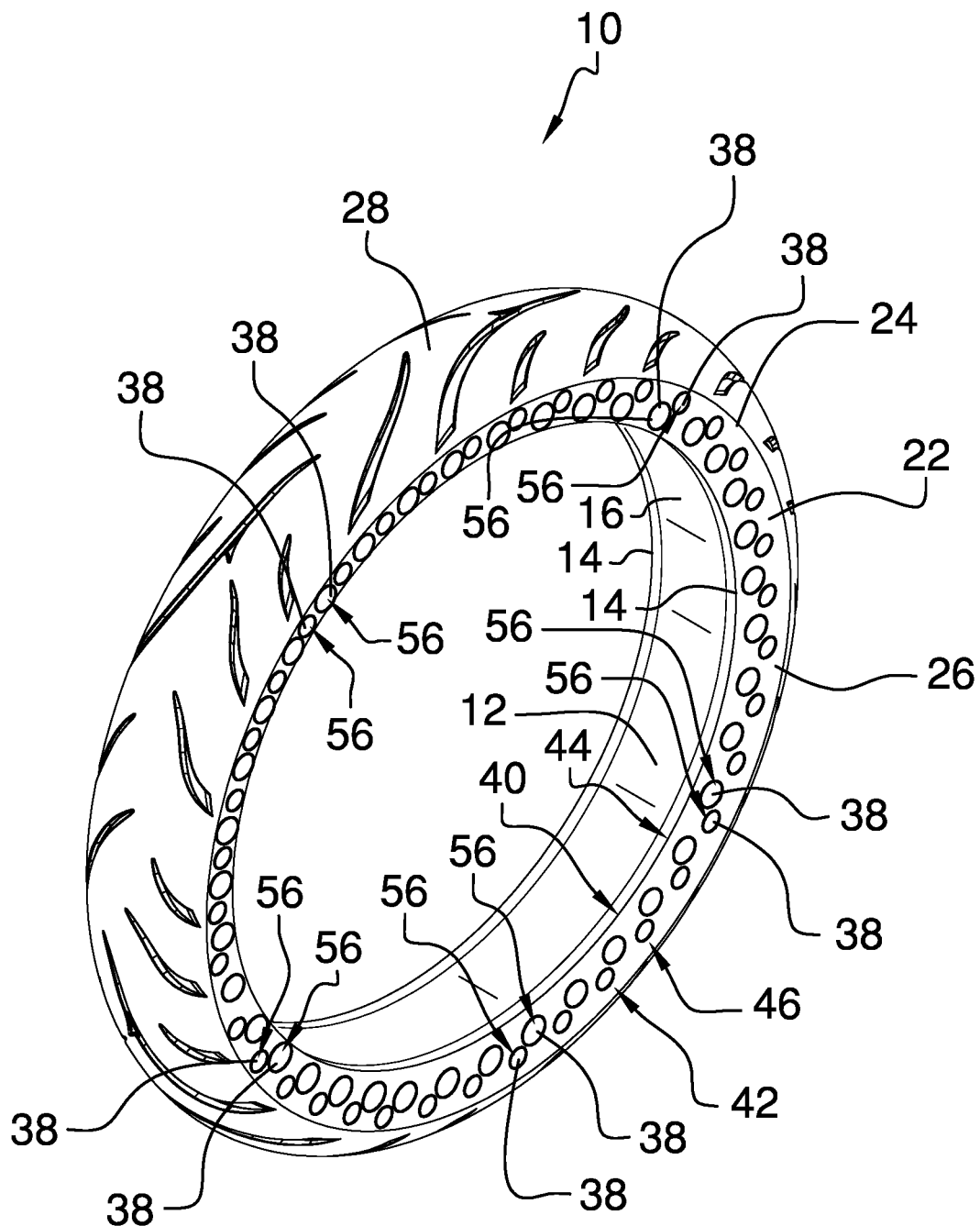
FIG. 1 is a top front side perspective view of a luminescent non-pneumatic tire device according to an embodiment of the disclosure.
Figure 2:
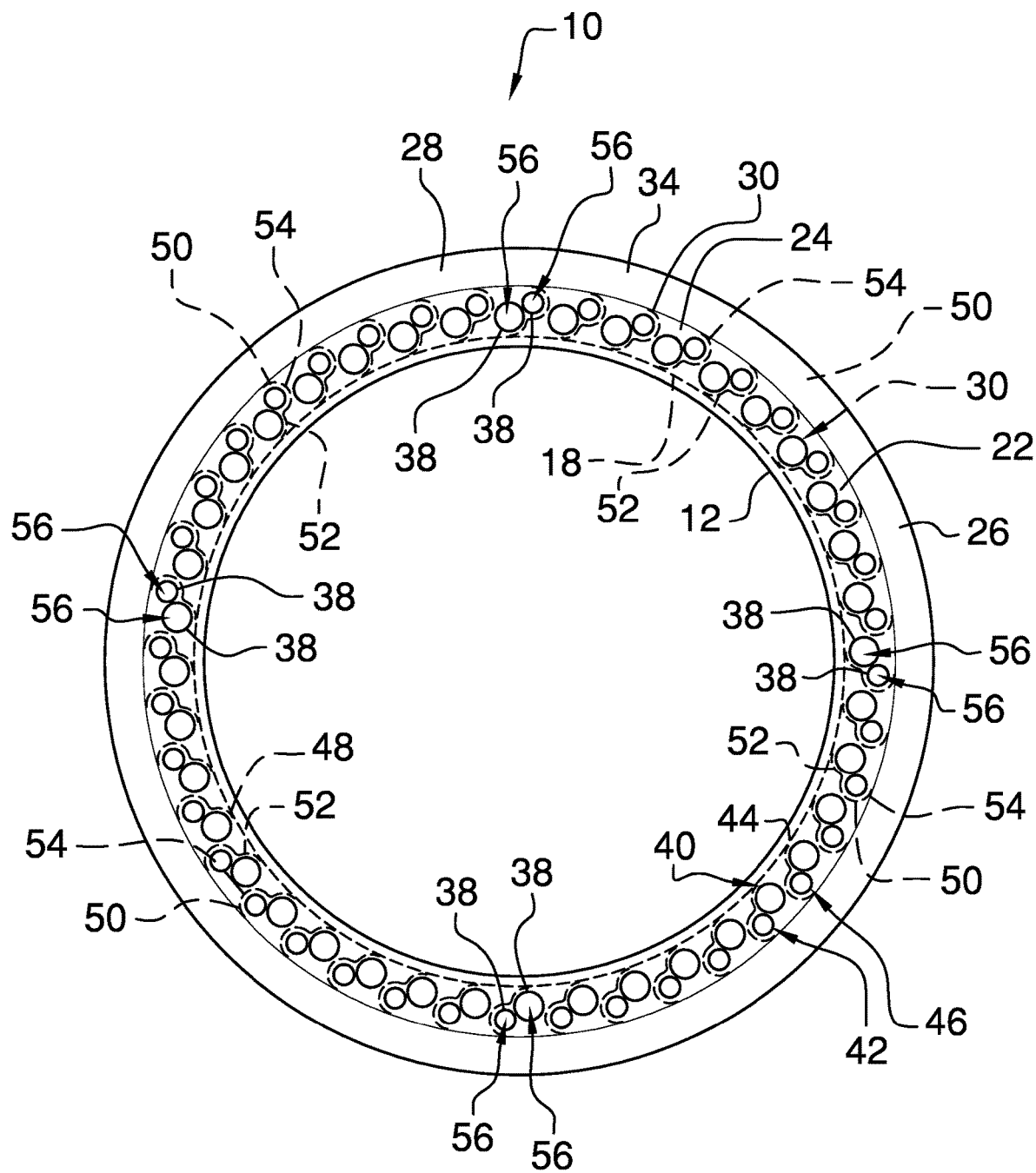
FIG. 2 is a side view of an embodiment of the disclosure.
Figure 3:
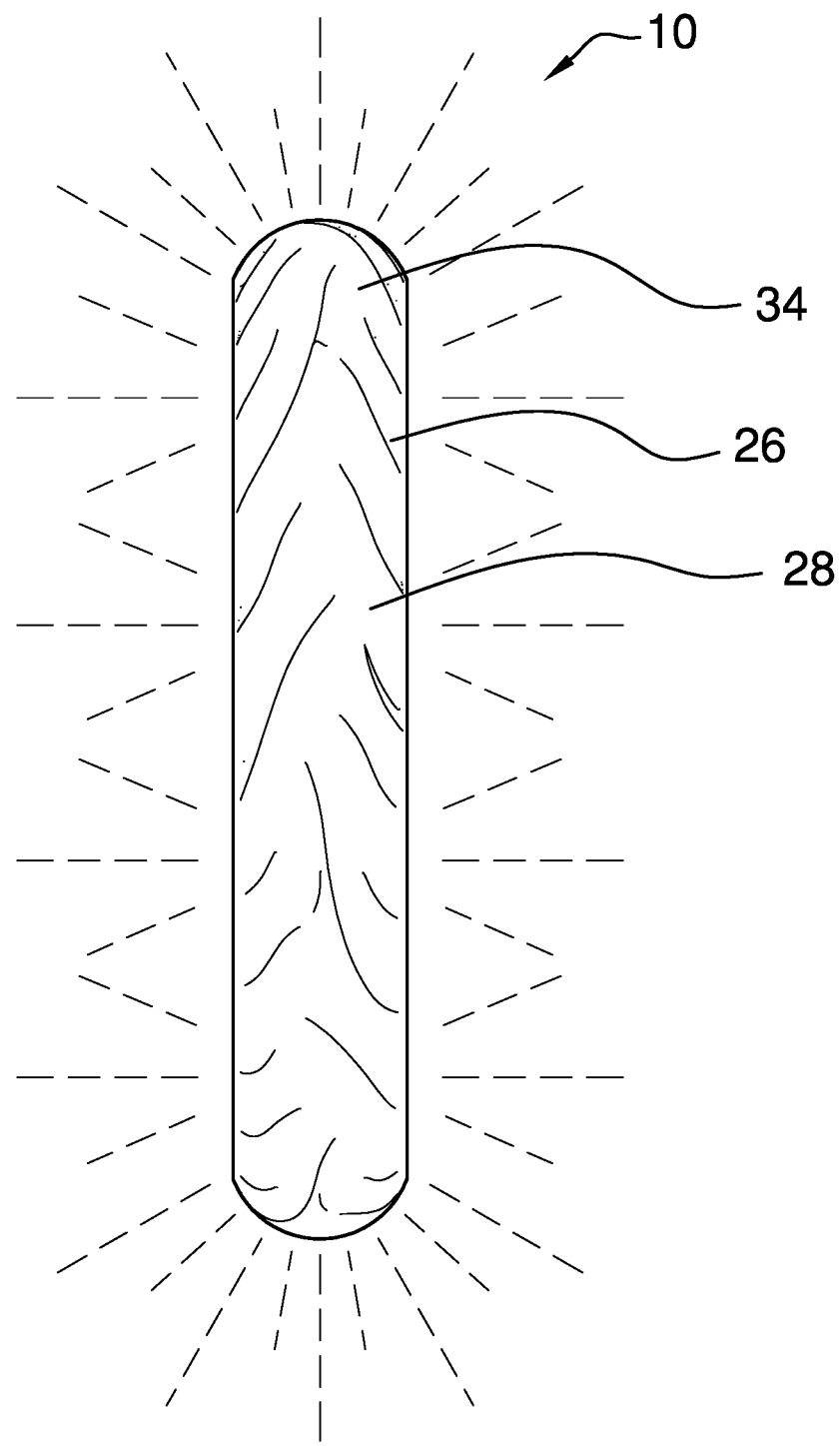
FIG. 3 is a back view of an embodiment of the disclosure.
Figure 4:
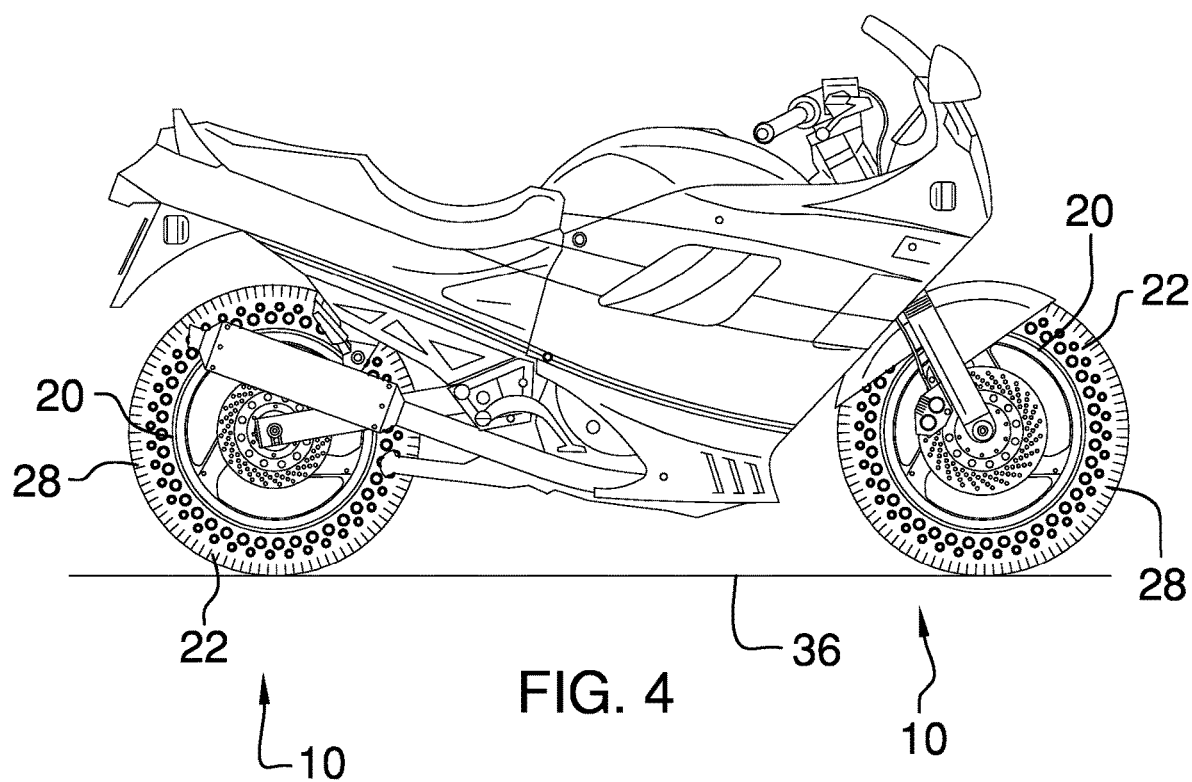
FIG. 4 is an in-use view of an embodiment of the disclosure.

With reference now to the drawings, and in particular to FIGS. 1 through 4 thereof, a new non-pneumatic tire embodying the principles and concepts of an embodiment of the disclosure and generally designated by the reference numeral 10 will be described.

As best illustrated in FIGS. 1 through 4, the luminescent non-pneumatic tire device 10 generally comprises a cylindrical inner wall 12 which has a pair of edges 14, an inner surface 16, and an outer surface 18 and is configured for fitting around and coupling to a wheel rim 20. Each of a pair of sidewalls 22 is coupled to and extends radially from an associated edge 14 of the pair of edges 14 of the inner wall 12 and has a distal end 24 relative to the associated edge 14 of the inner wall 12. Each sidewall 22 is resiliently deformable and comprises a photoluminescent material 26. A tread 28 is coupled to the distal edge 14 of each sidewall 22. Each of the tread 28, the pair of sidewalls 22, and the inner wall 12 cooperatively define an annular space 30. The tread 28 has an inner surface 32 adjacent to the annular space 30 and an outer surface 34 extending between the pair of sidewalls 22. The outer surface 34 of the tread 28 arcs between the pair of sidewalls 22, thereby having a shape of an outer segment of a torus. The tread 28 is resiliently deformable. The outer surface 34 of the tread 28 is configured for abutting a road surface 36 when the inner wall 12 is coupled to the wheel rim 20. And the tread 28 also comprises the photoluminescent material 26. The photoluminescent material 26 glows in dark conditions, increasing the visibility of the device 10 in addition to providing aesthetic appeal. The inner wall 12, sidewalls 22, and tread 28 may be constructed of a material comprising rubber or like material which resiliently deforms when compressed between the wheel rim 20 and the road surface 36.

Each of a plurality of cylindrical and resiliently deformable tubes 38 extends between the pair of sidewalls 22 and defines an associated aperture 56 of a plurality of aperture 56s extending through each sidewall 22. Each tube 38 may also be constructed of a material comprising rubber or like material. A first quantity of tubes 40 of the plurality of tubes 38 is evenly dispersed along a first tube circle 44 which is concentric with the inner wall 12. A second quantity of tubes 42 of the plurality of tubes 38 is evenly dispersed along a second tube circle 46 which is also concentric with the inner wall 12. The second tube circle 46 has a diameter greater than a diameter of the first tube circle 44. Each tube 38 of the second quantity of tubes 42 is positioned angularly between an associated pair of tubes 38 of the first quantity of tubes 40 and has a diameter less than a diameter of each tube 38 of the first quantity of tubes 40.

A cable 48 is coupled to and extending concentrically around the inner wall 12. Each of a plurality of elastically deformable flat springs 50 is coupled to and extends between the cable 48 and the inner surface 32 of the tread 28 such that each flat spring 50 extends at an incline relative to a radial line from a center axis of the inner wall 12 to the flat spring 50. Each flat spring 50 has a first arced portion 52 and a second arced portion 54, wherein the first arced portion 52 concentrically arcs around an associated tube 38 of the first quantity of tubes 40 and the second arced portion 54 concentrically arcs around an associated tube 38 of the second quantity of tubes 42. Each flat spring 50 may be constructed of steel or like material.

In use, the device 10 is mounted on the wheel rim 20 just like a pneumatic tire. As the device 10 rolls on the road surface 36, the flat springs 50 deflect as they are compressed between the wheel rim 20 and the road surface 36. The tubes 38 also deform when compressed between the wheel rim 20 and the road surface 36 to allow for the deflection of the flat springs 50. The plurality of flat springs 50 smooths out bumps in the road surface 36, minimizing forces experienced by the wheel rim 20. The photoluminescent material 26 also increases the visibility of the device 10 to other drivers nearby.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A luminescent non-pneumatic tire device comprising:
    an inner wall, said inner wall being cylindrical, said inner wall having a pair of edges, said inner wall having an inner surface and an outer surface, said inner wall being configured for fitting around and coupling to a wheel rim;
    a pair of sidewalls, each said sidewall being coupled to and extending radially from an associated edge of said pair of edges of said inner wall, each said sidewall having a distal end relative to said associated edge of said inner wall, each said sidewall being resiliently deformable;
    a tread, said tread being coupled to said distal edge of each said sidewall, each of said tread, said pair of sidewalls, and said inner wall cooperatively defining an annular space, said tread having an inner surface adjacent to said annular space, said tread having an outer surface extending between said pair of sidewalls, said tread being resiliently deformable, said outer surface of said tread being configured for abutting a road surface when said inner wall is coupled to the wheel rim, one of each said sidewall and said tread comprising a photoluminescent material;
    a cable, said cable being coupled to and extending concentrically around said inner wall;
    a plurality of flat springs, each said flat spring being coupled to and extending between said cable and said inner surface of said tread, each said flat spring being elastically deformable;
    a plurality of tubes, each said tube extending between said pair of sidewalls, each tube defining an associated aperture of a plurality of apertures extending through each said sidewall, each said tube being resiliently deformable;
    a first quantity of tubes of said plurality of tubes being evenly dispersed along a first tube circle, said first tube circle being concentric with said inner wall;
    a second quantity of tubes of said plurality of tubes being evenly dispersed along a second tube circle, said second tube circle being concentric with said inner wall, said second tube circle having a diameter greater than a diameter of said first tube circle, each said tube of said second quantity of tubes being positioned angularly between an associated pair of tubes of said first quantity of tubes, each said tube of said second quantity of tubes having a diameter less than a diameter of each tube of said first quantity of tubes; and
    each said flat spring having a first arced portion and a second arced portion, said first arced portion arcing around an associated tube of said first quantity of tubes, said second arced portion arcing around an associated tube of said second quantity of tubes.

2. The device of claim 1, further comprising said outer surface of said tread arcing between said pair of sidewalls, thereby having a shape of an outer segment of a torus.

3. The device of claim 1, further comprising each said tube being cylindrical.

4. The device of claim 1, further comprising each said flat spring extending at an incline relative to a radial line from a center axis of said inner wall to said flat spring.

5. The device of claim 1, further comprising each of said inner wall, each said sidewall, said tread, and each said tube comprises rubber.

6. The device of claim 1, further comprising each said flat spring being constructed of steel.

7. A luminescent non-pneumatic tire device comprising:
    an inner wall, said inner wall being cylindrical, said inner wall having a pair of edges, said inner wall having an inner surface and an outer surface, said inner wall being configured for fitting around and coupling to a wheel rim;

a pair of sidewalls, each said sidewall being coupled to and extending radially from an associated edge of said pair of edges of said inner wall, each said sidewall having a distal end relative to said associated edge of said inner wall, each said sidewall being resiliently deformable, each said sidewall comprising a photoluminescent material;

a tread, said tread being coupled to said distal edge of each said sidewall, each of said tread, said pair of sidewalls, and said inner wall cooperatively defining an annular space, said tread having an inner surface adjacent to said annular space, said tread having an outer surface extending between said pair of sidewalls, said outer surface of said tread arcing between said pair of sidewalls, thereby having a shape of an outer segment of a torus, said tread being resiliently deformable, said outer surface of said tread being configured for abutting a road surface when said inner wall is coupled to the wheel rim, said tread comprising the photoluminescent material;

a plurality of tubes, each said tube extending between said pair of sidewalls, each tube being cylindrical, each tube defining an associated aperture of a plurality of apertures extending through each said sidewall, each said tube being resiliently deformable, a first quantity of tubes of said plurality of tubes being evenly dispersed along a first tube circle, said first tube circle being concentric with said inner wall, a second quantity of tubes of said plurality of tubes being evenly dispersed along a second tube circle, said second tube circle being concentric with said inner wall, said second tube circle having a diameter greater than a diameter of said first tube circle, each said tube of said second quantity of tubes being positioned angularly between an associated pair of tubes of said first quantity of tubes, each said tube of said second quantity of tubes having a diameter less than a diameter of each tube of said first quantity of tubes;

a cable, said cable being coupled to and extending concentrically around said inner wall; and a plurality of flat springs, each said flat spring being coupled to and extending between said cable and said inner surface of said tread, each said flat spring extending at an incline relative to a radial line from a center axis of said inner wall to said flat spring, each said flat spring having a first arced portion and a second arced portion, said first arced portion concentrically arcing around an associated tube of said first quantity of tubes, said second arced portion concentrically arcing around an associated tube of said second quantity of tubes, each said flat spring being elastically deformable.

* * * * *